United States Patent
US 6,175,907 B1
Elliott et al.
Jan. 16, 2001

(54) APPARATUS AND METHOD FOR FAST SQUARE ROOT CALCULATION WITHIN A MICROPROCESSOR

(75) Inventors: Timothy A. Elliott; G. Glenn Henry, both of Austin, TX (US)

(73) Assignee: IP First, L.L.C, Fremont, CA (US)

( * ) Notice: Under 35 U.S.C. 154(b), the term of this patent shall be extended for 0 days.

(21) Appl. No.: 09/118,518

(22) Filed: Jul. 17, 1998

(51) Int. Cl.⁷ .................................................. G06F 15/00
(52) U.S. Cl. .................. 712/1; 712/7; 712/200; 712/210; 712/221; 708/500; 708/502; 708/503; 708/605
(58) Field of Search ............................. 712/1, 7, 23, 200, 712/210, 221; 708/500, 502, 503, 605

(56) References Cited

U.S. PATENT DOCUMENTS

| | | | |
|---|---|---|---|
| 4,298,951 | * 11/1981 | Hall | 708/605 |
| 5,157,624 | * 10/1992 | Hesson | 708/502 |
| 5,307,302 | * 4/1994 | Nakano | 708/605 |
| 5,517,611 | * 5/1996 | Deering | 395/503 |
| 5,619,439 | * 4/1997 | Yu et al. | 708/500 |
| 5,764,555 | * 6/1998 | McPherson et al. | 708/497 |
| 5,768,170 | * 6/1998 | Smith | 708/504 |
| 5,847,979 | * 12/1998 | Wong et al. | 708/500 |

* cited by examiner

Primary Examiner—John A. Follansbee
Assistant Examiner—Dzung C. Nguyen
(74) Attorney, Agent, or Firm—Richard K. Huffman; James W. Huffman (57) ABSTRACT

An apparatus and method for calculating a square root of an operand in a microprocessor are provided. The microprocessor has a plurality of square root instructions, each of which specifies a square root calculation precision. The apparatus includes translation logic and execution logic. The translation logic decodes the square root macro instruction into a plurality of prescribed-precision machine instructions according to the square root calculation precision specified by the plurality of square root instructions. The execution logic, coupled to the translation logic, receives the plurality of prescribed-precision machine instructions and calculates the square root of the operand according to the specified square root calculation precision. At least one of the plurality of square root instructions specifies the square root calculation precision such that less significant bits are calculated in the square root than are provided in the operand.

30 Claims, 8 Drawing Sheets

FIG. 1 (Related Art)

*Pipeline Microprocessor Architecture*

Square Root of a 4-Bit Fraction - Digit-Recurrence Technique

Radicand, $X = 0.1011_2 = 11/16 = 176/256$

Calculated Square Root, $Q = 0.1101_2 = 13/16$.

Final Remainder is $2^{-4}r_4 = 7/256 = X - Q^2 = (176 - 169)/256$.

FIG. 5 (Related Art)

*Conventional Square Root Calculation Timing*

| Cycle | Translate | FP Register | FP Execute |
|---|---|---|---|
| 1 | *** | *** | *** |
| 2 | MXSQRT MX1 | *** | *** |
| 3 | *** | FSQRT MX1 | *** |
| 4 | *** | *** | FSQRT MX1 |
| 5 | -- | -- | FSQRT MX1 |
| 6 | -- | -- | FSQRT MX1 |
| 7 | -- | -- | FSQRT MX1 |
| 8 | -- | -- | FSQRT MX1 |
| 9 | -- | -- | FSQRT MX1 |
| 10 | | | |
| | -- | | FSQRT MX1 |
| 69 | -- | -- | FSQRT MX1 |
| 70 | -- | -- | FSQRT MX1 |
| 71 | -- | -- | FSQRT MX1 |
| 72 | -- | -- | FSQRT MX1 |
| 73 | -- | -- | FSQRT MX1 |
| 74 | * | * | *** | pre-calculation translation/alignment 64 cycles to calculate square root post-calculation translation/alignment U.S. Patent    Jan. 16, 2001    Sheet 6 of 8    US 6,175,907 B1

*Limited-Precision Square Root Calculation Timing*

APPARATUS AND METHOD FOR FAST SQUARE ROOT CALCULATION WITHIN A MICROPROCESSOR

BACKGROUND OF THE INVENTION

1. Field of the Invention

This invention relates in general to the field of data processing in computers, and more particularly to an apparatus and method for calculating the square root of floating point operands.

2. Description of the Related Art

Software programs that execute on a microprocessor consist of macro instructions that together direct the microprocessor to perform a function. Each macro instruction directs the microprocessor to perform a specific operation that is part of the function such as loading data from memory, storing data in a register, or adding the contents of two registers.

A macro instruction may prescribe a simple operation, such as moving the contents of one register location to another register location. In contrast, it may prescribe a complex operation, such as deriving the cosine of a floating point number. Compared to the manipulation of integer data, the manipulation of floating point data by the microprocessor is complex and time consuming. Movement of integer data requires only a few cycles of a microprocessor clock; derivation of a cosine requires hundreds of machine cycles. Because floating point operations are basically more complex than integer operations, conventional microprocessors employ a dedicated floating point unit to improve the speed and efficiency of floating point calculations. The dedicated floating point unit may be part of the same mechanical package as the remainder of the microprocessor or it may reside in a separate mechanical package.

Within an x86-compatible microprocessor, a floating point macro instruction is decoded into a sequence of floating point micro instructions that direct the microprocessor to execute a floating point operation. The sequence of floating point micro instructions is passed to the floating point unit. The floating point unit executes the sequence of floating point micro instructions and provides a result of the floating point operation in a result register. Likewise, an integer macro instruction is decoded into a sequence of integer micro instructions that direct the microprocessor to execute an integer operation. The sequence of integer micro instructions is passed to the integer unit. The integer unit executes the sequence of integer micro instructions and provides a result of the integer operation in a result register.

In more recent years, desktop computational demands have placed a greater burden upon microprocessor designers to add increasingly more functionality to a microprocessor's instruction set. In fact, floating point operations are now so common now that a vast majority of present day floating point units perform their computations on operands which adhere to an industry standard format, called extended-precision format. An operand in extended-precision format has 64 significant bits.

Although the extended-precision format is employed internal to a floating point unit for computational purposes, operands may be stored in memory in formats having less than 64 significant bits: an operand stored in memory in single-precision format, for example, has only 24 significant bits. When the operand is provided from memory to the floating point unit, however, it is converted to extended-precision format. Subsequent computations performed with the converted operand thus yield a result in extended-precision format. For many applications, a higher precision result is welcomed. But for other applications, such as 3D graphics applications, such precision is unnecessary. More specifically, an operand representing information for a pixel on a video monitor need only be provided in single-precision format; the precision afforded by extra bits cannot be distinguished when the pixel is displayed. Hence, graphics applications routinely cause extended-precision results to be rounded or truncated to single-precision format.

Although conventional microprocessors provide for an extended-precision result to be rounded/truncated to single-precision format, their floating point logic still performs computations on extended-precision operands. For computational operations where the time required to perform a computation is not a function of the number of significant bits in its associated operands, translation to and from extended-precision format is transparent to the applications. However, the time required to execute many floating point computations is directly proportional to the number of significant operand bits. Extraction of a square root is exemplary of this case.

Typically, a square root is computed in a microprocessor using one of a class of iterative techniques whereby successive bits of the square root are calculated during each iteration. For instance, calculation of a square root in a conventional floating point unit requires roughly 64 iterations to compute significant digits in an extended-precision result: one bit of the extended-precision result is generated during each of the 64 iterations. But, if the extended-precision square root is specified by a macro instruction to be returned in single-precision format, then 40 of the iterations are essentially wasted in the computation of significant bits which are ultimately not used. Execution of the macro instruction is unnecessarily delayed. This is a problem affecting execution time for any application requiring calculation of a square root in any format less precise than extended-precision format.

Therefore, what is needed is a microprocessor for calculating a square root faster than has heretofore been provided.

In addition, what is needed is a microprocessor that calculates a square root of a floating point operand where the number of calculated significant bits in the square root are less than the number of significant bits in the floating point operand.

Furthermore, what is needed is a method for performing single-precision square root calculation in a microprocessor that eliminates unnecessary clock cycles associated with the performance of extended-precision square root extraction.

SUMMARY

To address the above-detailed deficiencies, it is an object of the present invention to provide an apparatus in a microprocessor for calculating the square root of a floating point operand faster than calculation in a conventional microprocessor.

Accordingly, in the attainment of the aforementioned object, it is a feature of the present invention to provide a microprocessor for calculating a square root of an operand, the microprocessor having a plurality of square root instructions, each of which specifies a square root calculation precision, the square root calculation precision specifying the number of significand bits to be provided in the square root. The microprocessor includes translation logic and execution logic. The translation logic receives the plurality of square root instructions, and provides a plurality of prescribed-precision machine instructions. The plurality of prescribed-precision machine instructions direct the microprocessor to calculate no more than the number of significand bits according to the square root calculation precision specified by the plurality of square root instructions. the execution logic is coupled to the translation logic. The execution logic receives the plurality of prescribed-precision machine instructions, and calculates the number of significand bits for the square root of the operand according to the square root calculation precision. At least one of the plurality of square root instructions specifies the square root calculation precision such that less significand bits are calculated in the square root than are provided in the operand.

An advantage of the present invention is that unnecessary delays associated with the manipulation of screen images in a graphics program are obviated.

Another object of the present invention is to provide a microprocessor that calculates a square root of a floating point operand where the number of calculated significant bits in the square root are less Man the number of significant bits in the floating point operand.

In another aspect, it is a feature of the present invention to provide a microprocessor for calculating a limited-precision square root of a floating point operand, the limited-precision square root having less significand bits than the floating point operand. The microprocessor has a translator and floating point execution logic. The translator receives a macro instruction prescribing a number of significand bits for the limited-precision square root, and decodes the macro instruction into a limited-precision square root micro instruction. The floating point execution logic is coupled to the translation logic. The floating point execution logic receives the limited-precision square root micro instruction, and calculates the limited-precision square root. The floating point execution logic calculates no more significand bits in the limited-precision square root than has been prescribed by the first number.

In yet another aspect, it is a feature of the present invention to provide an apparatus in a microprocessor for calculating a limited-precision square root of a floating point operand, the limited-precision square root having a first number of significand bits less than a second number of significand bits in the floating point operand. The apparatus includes a translator and floating point execution logic. The translator receives a macro instruction prescribing the first number of significand bits, and decodes the macro instruction into a limited-precision square root micro instruction. The floating point execution logic is coupled to the translation logic and receives and executes the limited-precision square root micro instruction. The floating point execution logic has a square root calculator. The square root calculator computes the limited-precision square root of the floating point operand only to the first number of significand bits according to a precision specified in the limited-precision square root micro instruction. The floating point operand is provided to the square root calculator in extended-precision format.

In a further aspect, it is a feature of the present invention to provide a microprocessor for calculating a limited-precision square root or an extended-precision square root of a floating point operand, where the floating point operand is provided in extended-precision format. The microprocessor has a translator and floating point execution logic. The translator receives a macro instruction prescribing a calculated precision for a square root, and decodes the macro instruction into an associated micro instruction. When the calculated precision prescribed by the macro instruction is extended-precision, the associated micro instruction is an extended-precision square root micro instruction, directing the microprocessor compute a number of significand bits for the square root commensurate with extended-precision format. When the calculated precision prescribed by the macro instruction is single-precision, the associated micro instruction is a single-precision square root micro instruction, directing the microprocessor compute a number of significand bits for the square root commensurate with single-precision format. The floating point execution logic is coupled to the translation logic. The floating point execution logic receives and executes the associated micro instruction, where the floating point execution logic calculates only a number of significand bits for the square root according to the calculated precision.

Another advantage of the present invention is that applications which do not require precision according to industry standards can execute much faster than has heretofore been provided.

Yet another object of the present invention is to provide a method for performing single-precision square root calculation in a microprocessor that eliminates unnecessary clock cycles associated with the performance of extended-precision square root extraction.

In yet a further aspect, it is a feature of the present invention to provide a method in a microprocessor for calculating a limited-precision square root of a floating point operand, the limited-precision square root having a number of calculated significand bits less than the number of significand bits in the floating point operand. The method includes translating a macro instruction into a limited-precision micro instruction, the limited-precision micro instruction specifying the number of significand bits to calculate; and calculating the limited-precision square root only up to the number of significand bits specified by the translating.

Yet another advantage of the present invention is that a microprocessor only executes the number of clock cycles associated with calculation of essential bits in a square root.

BRIEF DESCRIPTION OF THE DRAWINGS

These and other objects, features, and advantages of the present invention will become better understood with regard to the following description, and accompanying drawings where.

DETAILED DESCRIPTION

In view of the above background on techniques for calculating the square root of a floating point operand in a microprocessor, several related art examples will now be described with reference to FIGS. 1 through 5. These examples illustrate the disadvantageous nature of present day square root computation techniques when employed in an x86-compatible microprocessor. Following this discussion, a detailed description of the present invention will be provided with reference to FIGS. 6 through 8. Use of the present invention allows the square root of a floating point operand to be calculated much faster than has heretofore been provided.

Figure 1:
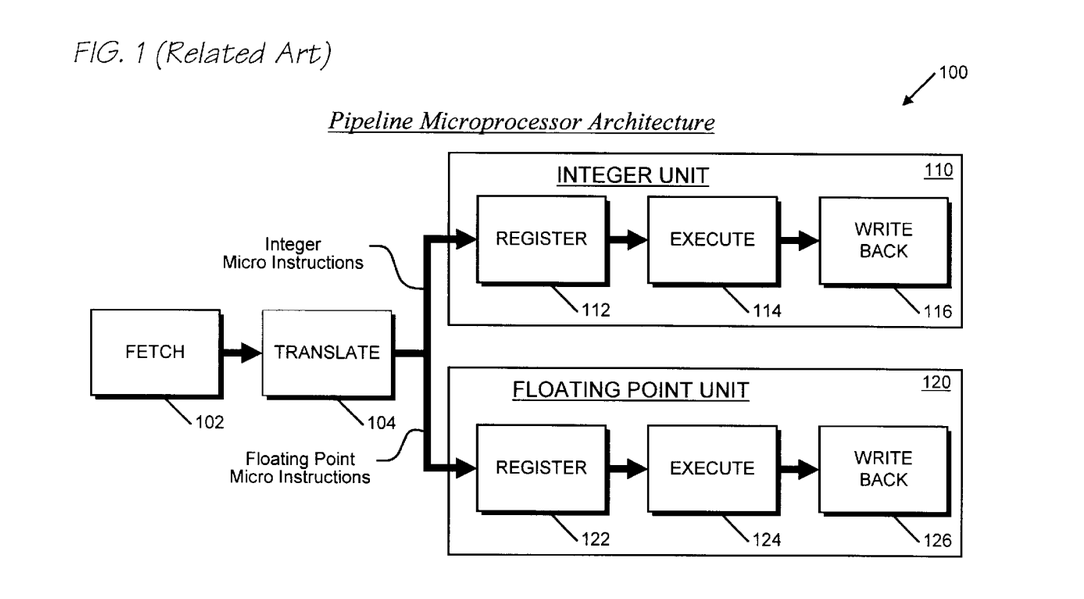
FIG. 1 is a block diagram of pipeline microprocessor featuring parallel integer and floating point execution units.

Referring to FIG. 1, a block diagram of a related art pipeline microprocessor 100 is presented. The microprocessor 100 includes a fetch stage 102, a translate stage 104, an integer unit 110, and a floating point unit 120. The floating point unit 120 is in parallel with the integer unit 110. The integer unit 110 has three stages: register 112, execute 114, and write back 116. The floating point unit 120 has three like stages: register 122, execute, 124, and write back 126.

Operationally, the fetch stage 102 fetches macro instructions from memory (not shown) for execution by the microprocessor 100. The translate stage 104 translates, or decodes, a fetched macro instruction into associated micro instructions, also called machine instructions, each directing the microprocessor to perform a specific subtask related to accomplishment of a higher level operation, which is specified by the fetched macro instruction. Because of fundamental differences between operations involving integers and operations involving floating point numbers, microprocessor designers have historically segregated hardware and associated macro instructions for the performance of floating point subtasks from that required to perform integer subtasks.

Thus, the translate stage 104 decodes a floating point macro instruction into a sequence of floating point micro instructions to accomplish a specified floating point operation. Likewise, the translate stage 104 decodes an integer macro instruction into a sequence of integer micro instructions to accomplish a specified integer operation. The integer micro instructions are passed from the translate stage 104 to the integer unit register stage 112. The integer unit register stage 112 retrieves operands specified by the integer micro instructions from a register file (not shown) for use by later stages in the integer pipeline. The integer unit execute stage 114 executes subtasks specified by the integer micro instructions. Examples of subtasks performed by the execute stage 114 include address calculation, integer arithmetic, and retrieval/storage of data from/to memory. The integer unit write back stage 116 writes results of the executed subtasks back into the register file.

Likewise, the floating point micro instructions are passed from the translate stage 104 to the floating point unit register stage 122. The floating point unit register stage 122 retrieves operands prescribed by the floating point micro instructions from a floating point register file (not shown), for use by later stages in the floating point pipeline. The floating point unit execute stage 124 executes floating point subtasks specified by the floating point micro instructions. Examples of subtasks performed by the floating point execute stage 124 include floating point arithmetic, square root, and transcendental functions (i.e., sine, cosine, etc.). The floating point unit write back stage 126 writes results of the executed subtasks back into the floating point register file.

Micro instructions move through successive stages of the microprocessor pipeline in synchronization with a microprocessor clock. Optimally, while any given stage in the pipeline is executing a micro instruction, the previous stage should be executing the next, or following, micro instruction. If a preceding micro instruction within one stage requires more than one cycle to completely execute, then following micro instructions are stalled until execution of the preceding micro instruction is completed. When a stall occurs, pipeline slips are inserted into the pipeline to insure that the following micro instructions do not prematurely advance in the pipeline.

In contrast to the integer unit 110, the floating point unit 120 has complex computational logic that is dedicated to performing floating point data manipulations. For example, addition of two integers in the integer unit 110 takes roughly one cycle of a microprocessor clock while calculation of the cosine of an operand in the floating point unit 120 requires hundreds of clock cycles.

As desktop computing systems have become increasingly more common in the workplace, requirements for microprocessor instructions that perform complex floating point operations have placed more of a burden on floating point hardware to execute these floating point macro instructions without undue delay. Additionally, floating point applications are so widespread now that most microprocessors process floating point data in accordance with accepted industry standards. These standards denote various formats for binary representation of floating point numbers along with rules for calculating and interpreting floating point results.

Figure 2:
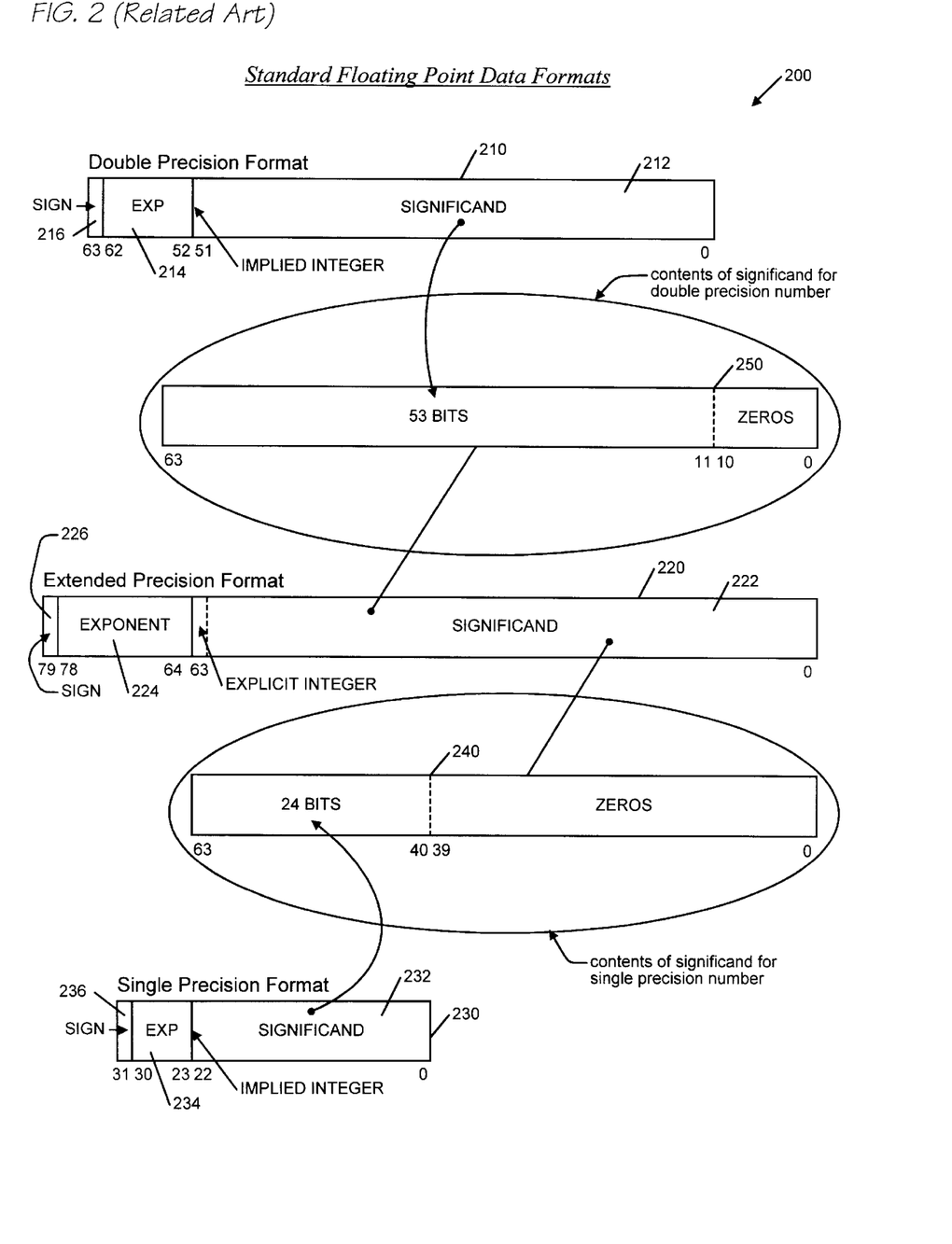
FIG. 2 is a diagram depicting industry standard formats for floating point numbers.

Now referring to FIG. 2, a diagram 200 is presented illustrating the predominant industry standard formats for representation of floating point numbers. The standard most widely adhered to for x86-compatible desktop applications is IEEE Std 754-1985, *IEEE Standard for Binary Floating-Point Arithmetic*. The diagram 200 presents three commonly used formats from the standard: double-precision format 210, extended-precision format 220, and single-precision format 230. Typical x86-compatible floating point units execute floating point micro instructions on operands provided in the extended-precision format 220, however, the operands can be stored in memory in any of the three formats 210, 220, 230. Thus, the diagram 200 also depicts an extended-precision significand 240 resulting from translation of an operand stored in the single-precision format 230 and an extended-precision significand 250 resulting from translation of an operand stored in the double-precision format 210.

An operand stored in the single-precision format 230 includes a sign bit 236, an 8-bit exponent 234, and a 23-bit significand 232. The sign bit 236 indicates whether the operand is positive or negative. The exponent 234 is a biased indication of the power of base two to which the significand 232 is raised. The significand 232 includes an integer part and a fraction part. With the exception of zero, the integer part for all encoded floating point numbers is equal to one. And since zero has a unique encoding, i.e., both the exponent 234 and the fraction part are set to zero, then it is not necessary to explicitly store the integer part. Consequently, the diagram 200 shows that the integer part is implied in the single-precision format 230 rather than explicitly depicted. The 23 bits of the significand 232 are the fraction bits.

An operand stored in the double-precision format 210 includes a sign bit 216, an 11-bit exponent 214, and a 52-bit significand 212. The sign bit 216 indicates whether the operand is positive or negative. The exponent 214 is a biased indication of the power of base two to which the significand 212 is raised. The significand 212 includes an integer part and a fraction part. Like the single-precision format 230, the integer part of the double-precision format 310 is implied rather than explicitly depicted. The 52 bits of the significand 212 are the fraction bits.

An operand in the extended-precision format 220 includes a sign bit 226, a 15-bit exponent 224, and a 64-bit significand 222. The sign bit 226 indicates whether the operand is positive or negative. The exponent 224 is a biased indication of the power of base two to which the significand 222 is raised. The significand 222 includes an integer part and a fraction part. Unlike the single- or double-precision format 230, 210, the extended-precision format explicitly depicts the integer part of an encoded floating point number. The integer part is one bit and the remaining 63 bits of the significand 222 are the fraction bits.

In an x86-compatible microprocessor, operands may be stored in the single-precision format 230 and the double-precision format 210 only in memory. When an operand is retrieved from memory into a floating point register file, it is translated into the extended-precision format 220. All floating point operations are performed on operands provided in extended-precision format 220 to produce results in extended-precision format 220. An extended-precision result may be written to memory in any of the three standard formats 210, 220, 230. When it is written to memory in single- or double-precision format 230, 210, the extended-precision result is appropriately rounded or truncated.

When a number in double-precision format 210 is translated to extended-precision format 220, its significand 250 includes an integer bit, the 52-bit significand 212, and 11 appended zeros. When a number in single-precision format 230 is translated to extended-precision format 220, its significand 240 includes an integer bit, the 23-bit significand 232, and 40 appended zeros. At first glance, it may appear that operands stored in single- or double-precision format 230, 210 carry a number of insignificant significand bits when provided to a floating point unit. Yet, multiplication of a single-precision operand by another single-precision operand will yield a result having approximately twice the number of significant bits of either of the two operands. Hence, simple operations performed on single-precision operands can easily yield 64 significant significand bits in an extended-precision result.

A square root calculation is a good example where the floating point operation performed on an operand having many initially insignificant bits may yield significant bits in all 63 bit positions of the fraction part of its extended-precision result. Because it is generally important to preserve the precision of floating point operands throughout a computation, industry standards also address the precision to which results are calculated for certain arithmetic operations. IEEE Std 854-1987, *IEEE Standard for Radix-Independent Floating-Point Arithmetic*, directs that the precision of the result of a square root operation be at least equal to the precision of its radicand. More specifically, a compliant microprocessor must calculate at least a single-precision square root for a single-precision radicand, at least a double-precision square root for a double-precision radicand, and at least an extended-precision square root for an extended-precision radicand. Practically, because conventional floating point units internally utilize the extended-precision format 220, they inherently comply with the precision requirements of IEEE Std 854-1987. In other words, to calculate an extended-precision square root from a single-precision radicand is compliant with the standard.

While the above-cited industry standards have served to promote increased consistency with regard to floating point computations, the disadvantages of such standardization are brought to light in terms of program execution delays. For instance, 3-dimensional (3D) graphics applications are quite common in today's desktop computer systems. These applications allow an operator to depict and manipulate the orientation of objects on a video monitor. But, to display a pixel on a video monitor requires no more precision than that of an operand in single-precision format 230, regardless of how the pixel is manipulated by the 3D application. More specifically, a graphics macro instruction in the 3D graphics application may calculate a visual projection of a given object to be displayed on the video monitor. To do so requires that many square root computations be performed. And, because today's floating point units routinely translate operands to extended-precision format 220 and perform their calculations to yield extended-precision results, pixel attributes in the projected object are provided in extended-precision format 220. But, because extended-precision is entirely unnecessary for video monitor display, most graphics electronics only provide for single-precision inputs. As a result, 3D applications either round an extended-precision result to single-precision format 230 following computation or the 3D applications specify a precision to the host microprocessor for calculation of associated operands. In fact, some x86-compatible microprocessors allow an application to specify the precision of results of floating point operations. However, although the microprocessors allow of a result's precision to be specified, the operations internal to their floating point units are, nevertheless, performed on extended-precision operands. Following the operations, the extended-precision results are rounded or truncated to the specified precision. Consequently, for square roots generated in 3D graphics applications, standard-compliant calculations are performed when standard compliance for precision is not required. Extended-precision results of the calculations are then rounded or truncated because such precision is unnecessary for video display. As a result, valuable program execution time is wasted by the floating point unit performing nonessential computation of significant bits which are to be immediately discarded. One skilled in the art will appreciate that the cumulative effect of superfluous manipulation of many thousands of pixels can add significant delay to execution time of a given 3D application. For real-time 3D applications, such delays are unacceptable. To more fully convey the delays caused by these unnecessary calculations when computing a square root, attention is now directed to FIG. 3.

Figure 3:
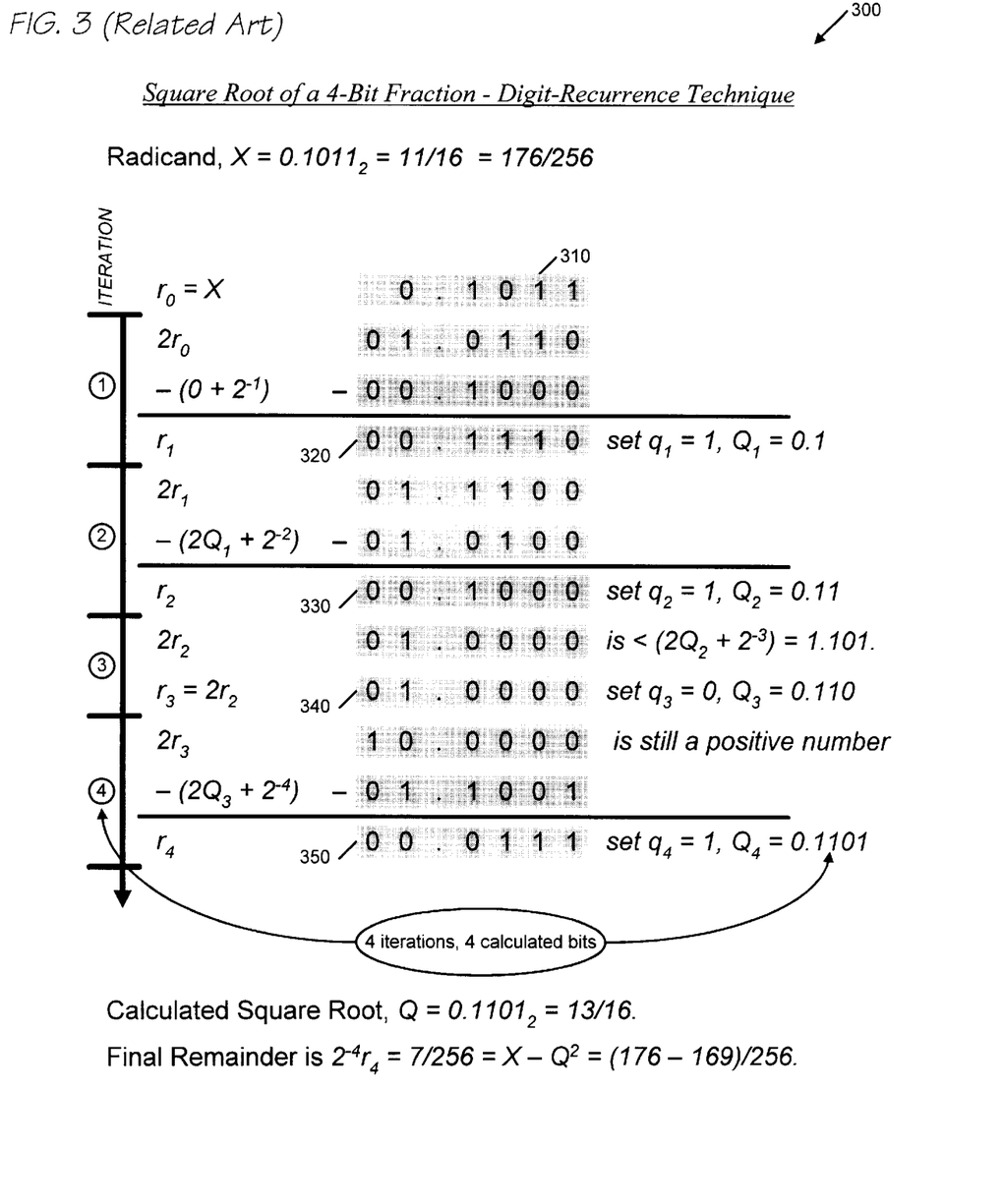
FIG. 3 is a diagram illustrating calculation of the square root of 4-bit floating point operand using a digit-recurrence technique.

FIG. 3 is a diagram 300 illustrating calculation of a 4-bit square root of a 4-bit floating point operand 310. Techniques for calculating a square root in a microprocessor fall into two classes: Newton-Raphson techniques and digit-recurrence techniques. Both classes iteratively refine the accuracy of a square root, but the two classes differ in level of precision of their results at the completion of each iteration. The precision of a Newton-Raphson iteration result is equal to the precision of its radicand at the completion of each iteration. In contrast, an iteration result calculated using a digit-recurrence technique has more bits of precision than a previous iteration result.

To elaborate, the Newton-Raphson class of techniques uses the relationship of a square root to its associated radicand, A, as shown below, to compute the reciprocal of the square root.

$$\sqrt{A} = \left(\frac{1}{\sqrt{A}}\right) \times A$$

The reciprocal of the square root of A is iteratively calculated according to the following algorithm, where the next calculation of the reciprocal, $x_{n+1}$, is calculated using the previously calculated reciprocal, $x_n$.

$$x_{n+1} = x_n + \frac{x_n}{2}(1 - Ax_n^2)$$

Following calculation of the reciprocal, the desired square root is calculated by reciprocating the reciprocal. One skilled in the art will observe that the Newton-Raphson class of techniques yields iteration results having a precision equal to the precision of the radicand and that accuracy of the calculated square root quadratically converges to value of the true square root. The number of iterations required to converge to an acceptable square root, i.e., a result differing by an acceptable amount from the true square root, is a function of the initial guess. Because the number of iterations required to converge to an acceptable accuracy are not usually known at the time of calculation, Newton-Raphson techniques are not typically employed in present day microprocessors.

Digit-recurrence techniques, on the other hand, calculate significant digits of the square root 350 during each iteration, beginning with the most significant digit. For this class of techniques, the level of precision to which a square root result is computed is essentially a function of the number of digits generated. More specifically, the precision of the square root result is proportional to the number of iterations executed. Hence, because precision of a result is a function of the number of iterations executed, most microprocessors employ digit-recurrence techniques for calculating a square root.

A number of different digit-recurrence techniques are found in present day microprocessors, but they all possess the characteristic noted above for the digit-recurrence class: significant bits of increasing precision in the result 350 are generated during each iterative step. For the purpose of illustration, FIG. 3 presents one of the digit-recurrence techniques for square root extraction found in Koren's *Computer Arithmetic Algorithms*, Prentice Hall, 1993, ISBN: 0131519522. In the diagram 300, four iterations of the digit-recurrence technique are shown to calculate a square root having four bits of precision, one bit of precision being calculated during each of the four iterations.

The diagram 300 depicts the calculation of the square root of a floating point operand having only a fraction part, however, one skilled in the art will appreciate that the position of the decimal point in representation and calculation for such techniques is a function of the value of the exponent and that translation to a convenient form for computation of the square root is easily achieved.

For the digit-recurrence technique shown in the diagram 300, the square root, Q, of a radicand 310, X, is denoted by $Q_m = (0 \cdot q_1 q_2 \ldots q_m)$. One bit of precision is generated during each of m iteration steps. The partially developed root at iteration i is denoted by $$Qi = \sum_{k=1}^{i} q_k 2^{-k}.$$

So, $Q = Q_i + r_i 2^{-i}$, where $r_i$ is a remainder term at iteration step i. The remainder term at step i is calculated according to the following equation:

$$r_i = 2r_{i-1} - q_i(2Q_{i-1} + q_i 2^{-i}).$$

Initially, the remainder term is the radicand, X, and $Q_0 = 0$. The relationship for the first iteration is formed from the above equation as:

$$r_1 = 2r_0 - q_1(0 + q_1 2^{-1}) = 2X - q_1(0 + q_1 2^{-1}).$$

Next, the square root digit, $q_1$, is assumed to be equal to 1. A tentative remainder is calculated according to the assumption that $q_i$ is equal to 1. Thus, $$r_i = 2r_{i-1} - (2Q_{i-1} + 2^{-i}).$$

If the tentative remainder is positive, then the assumption was correct; $q_i$ is set to 1 and $r_i$ is as computed above. However, if the tentative remainder is negative, then $q_i$ is set to 0 and $r_i$ becomes $2r_{i-1}$. A number of iterations are executed as described above until desired precision of the result is achieved. Progression of the digit-recurrence technique in the diagram 300 is shown with respect to iteration numbers, roughly equivalent to one cycle of a microprocessor pipeline clock.

During iteration 1 of the diagram 300, the first significant digit, $q_1$, is assumed to be equal to 1. Also during iteration 1, a tentative remainder 320, $r_1$, is calculated based on the assumption. Because the tentative remainder 320, $r_1$, is positive, $q_1$ is set to 1. Thus, $Q_1$ is equal to 0.1. One bit of precision has been calculated during one iteration of the technique.

During iteration 2, the second significant digit, $q_2$, is assumed to be equal to 1. Also during iteration 2, a tentative remainder 330, $r_2$, is calculated based on the assumption. Because the tentative remainder 330, $r_2$, is positive, $q_2$ is set to 1. Thus, $Q_2$ is equal to 0.11. Two bits of precision have been calculated during two iterations of the technique.

During iteration 3, the third significant digit, $q_3$, is assumed to be equal to 1. Also during iteration 2, a third tentative remainder (not shown) is calculated based on the assumption that $q_3$ is equal to 1. But, because the third tentative remainder is negative, $q_3$ is set to 0. Thus, $Q_3$ is equal to 0.110. Accordingly, the remainder 340, $r_3$, is set to be equal to $2r_2$. Three bits of precision have been calculated during three iterations of the technique.

During iteration 4, the fourth significant digit, $q_4$, is assumed to be equal to 1. Also during iteration 4, a tentative remainder 350, $r_4$, is calculated based on the assumption. Because the tentative remainder 350, $r_4$, is positive, $q_4$ is set to 1. Thus, $Q_4$, the result, is equal to 0.1101. Four bits of precision have been calculated during four iterations of the technique. At this point, the technique completes.

The digit-recurrence technique shown in the diagram 300, or a similar digit-recurrence technique, is employed in present day microprocessors for calculation of the square root of a floating point operand, primarily because execution time to yield a desired precision is known. One skilled in the art will furthermore comprehend that calculation of the square root of a radicand in extended-precision format requires 64 iteration steps, plus steps before and after to translate the radicand as described earlier. Hence, because conventional microprocessors employ extended-precision floating point hardware, computation of the significant bits of the square root of a floating point operand requires 64 iteration steps, regardless of precision desired for the result. Although calculation of a square root in this manner produces a standard-compliant result, applications which do not require standard-compliant precision suffer. Employment of an extended-precision square root calculator in a present day microprocessor is more completely described with reference to FIG. 4.

Figure 4:
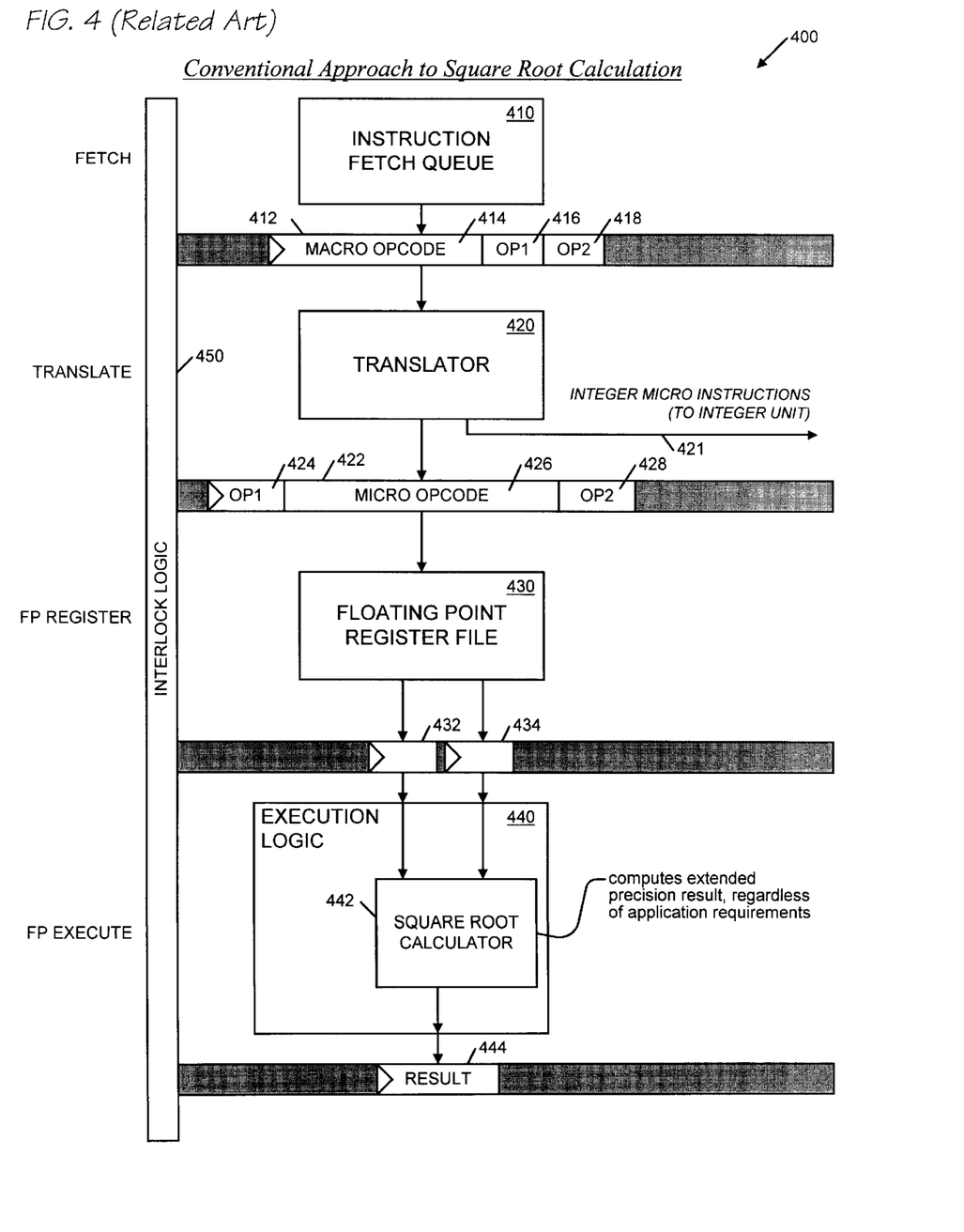
FIG. 4 is a block diagram of a floating point pipeline path in a related art microprocessor for calculating a limited-precision square root of a floating point operand.

FIG. 4 is a block diagram 400 of a floating point pipeline path in a related art microprocessor 400 for calculating a limited-precision square root of a floating point operand. For clarity, integer stages of the microprocessor 400 are not shown because they are not relevant to this discussion. The block diagram shows four pipeline stages associated with execution of an instruction requiring calculation of the limited-precision square root: fetch, translate, floating point register, and floating point execute. A floating point write back stage is not shown because it also is not relevant to this discussion. Although a specific microprocessor may segregate its floating point unit differently into slightly more or less stages, one skilled in the art, nonetheless, will appreciate that the stages shown in FIG. 4 are representative of a typical microprocessor 400. The microprocessor 400 also includes interlock logic 450.

The fetch stage has an instruction fetch queue 410 connected to an instruction buffer 412. The translate stage has a translator 420 that provides an output to a floating point micro instruction buffer 422. The register stage has a floating point register file 430. Outputs of the floating point register file 430 are provided to first and second floating point operand registers 432, 434. The floating point execute stage includes floating point execution logic 440, which receives inputs from the first and second operand registers 432, 434. The floating point execution logic 440 includes an extended-precision square root calculator 442 according to a digit-recurrence technique. The floating point execution logic 440 provides its output to a floating point result register 444. The contents of the result register 444 are provided to the write back stage so that they may be written back into the floating point register file 430 or into memory (not shown) when a micro instruction completes execution.

In operation, the instruction fetch queue 410 fetches macro instructions from memory (not shown) for execution by the microprocessor 400. The macro instructions are sequentially provided to the instruction buffer 412. The instruction buffer 412 has three fields: a macro opcode field 414, a first macro operand field 416, and a second macro operand field 418. In the case of a macro instruction requiring calculation of the limited-precision square root, the macro opcode field 414 directs the microprocessor 400 to extract the square root of the operand, which has been previously stored in an architecturally defined register. The architecturally defined register is either prescribed by the first macro operand field 416 or is implicitly prescribed by the macro opcode field 414. The second macro operand field 418 does not contain an operand for this type of instruction.

The translator 420 retrieves a macro instruction from the macro instruction buffer 412 and decodes it into an associated sequence of micro instructions. Micro instructions directed to the integer unit (not shown) are provided on bus 421. Micro instructions directed to the floating point unit are provided to the floating point micro instruction buffer 422. The floating point micro instruction buffer 422 has three fields. Contents of a micro opcode field 426 direct the floating point unit to perform a specific subtask. Operands are provided in first and second micro operand fields 424, 428. In the event of a micro instruction directing calculation of a limited-precision square root, the micro opcode field 426 directs the microprocessor to extract the square root in extended-precision format and then round/truncate the square root to the precision required by the application. Additionally, the first micro operand field 424 would contain a reference to the architecturally defined register in the floating point register file 430. The second micro operand field 428 does not contain an operand for this type of instruction. Thus, micro instructions are provided to the floating point unit of the microprocessor 400.

If the micro opcode so directs, contents of the floating point register file 430 are retrieved and placed into the first and second operand registers 432, 434. For a micro instruction directing calculation of a limited-precision square root, a radicand, placed into the floating point register file 430 by preceding micro instructions, is retrieved and placed into the first operand register 432. The second operand register 434 is not used for this type of instruction.

The floating point execution logic 440 retrieves the contents of registers 432 and 434 and executes the subtask specified by the micro opcode. For execution of a micro instruction directing calculation of a limited-precision square root, the radicand is retrieved from register 432 and is provided to the extended-precision square root calculator 442 in extended-precision format. Thereafter, an extended-precision square root extraction operation is executed using a digit-recurrence technique as described above. Regardless of the precision required for the square root, the extended-precision square root calculator 442 computes an extended-precision square root. The extended-precision square root is subsequently rounded, if required by the application. The calculated square root is then placed in the result register 444.

Because extraction of the square root requires numerous pipeline cycles while in the extended-precision square root calculator 442, the interlock logic 450 inserts slips into the pipeline to preclude following instructions from prematurely advancing in the pipeline. Execution of an instruction directing calculation of a limited-precision square root is more particularly described with reference to FIG. 5.

Figure 5:
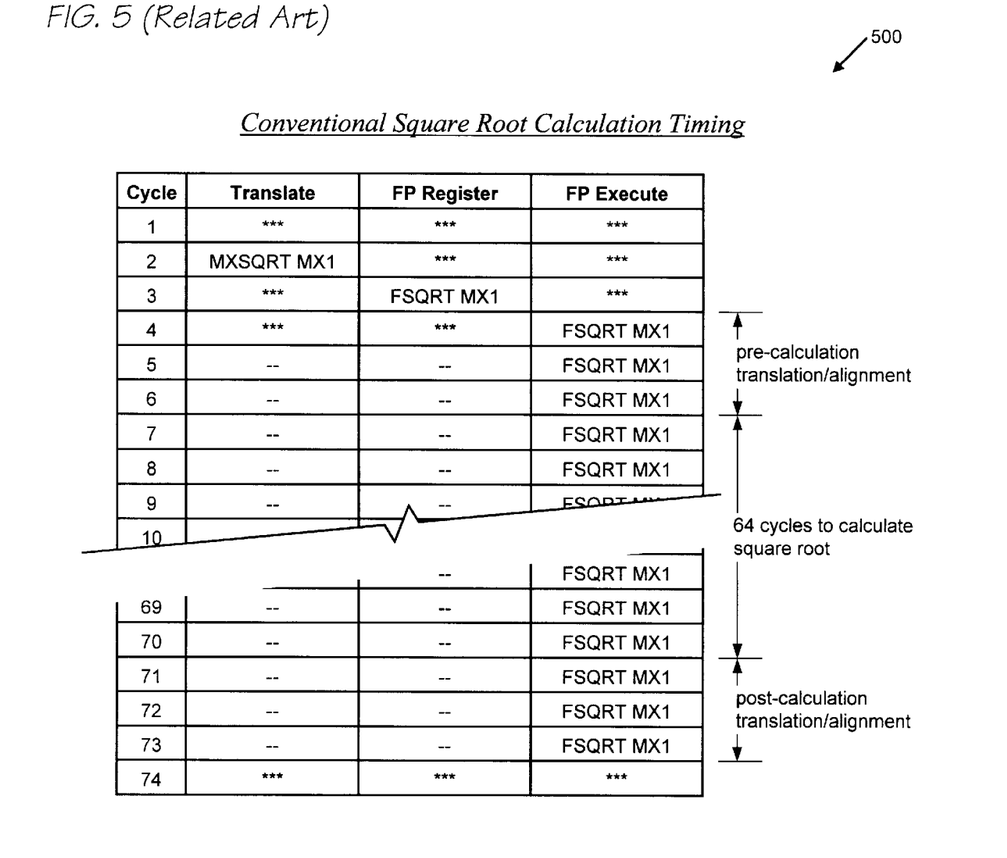
FIG. 5 is a table illustrating execution a graphics-related instruction requiring computation of a limited-precision square root by the microprocessor of FIG. 4.

FIG. 5 is a table 500 illustrating execution of a graphics-related macro instruction directing calculation of a limited-precision square root by the microprocessor 400 of FIG. 4. The macro instruction directing calculation of the limited-precision square root is designated by MXSQRT MX1. It directs the microprocessor 400 to calculate a single-precision square root of a radicand contained in floating point register MX1. The translator 420 decodes the macro instruction directing calculation of the limited-precision square root into an extended-precision square root micro instruction, designated by FSQRT MX1. The extended-precision square root micro instruction directs the microprocessor 400 to calculate an extended-precision square root of a radicand, previously loaded into register MX1 in the floating point register file 430. Various means are used to specify the precision of the result, i.e., single-precision. In an x86-compatible microprocessor, precision bits in a control register are normally set to indicate desired precision.

Progression of instructions through the microprocessor 400 is shown with respect to cycles of a pipeline clock. Instructions before and after instructions of interest are designated by "***." Voids, or slips in the pipeline are designated by "--." For clarity, FIG. 5 only depicts those stages of the microprocessor pipeline that are relevant to this discussion. Hence, the fetch stage and floating point write back stage are not shown.

During cycle 2, the graphics-related macro instruction directing calculation of the limited-precision square root, MXSQRT MX1, proceeds through the translate stage of the pipeline. Therein, the translator 420 retrieves it from the macro instruction buffer 412 and decodes it into the micro instruction described above.

During cycle 3, the extended-precision square root micro instruction, FSQRT MX1, proceeds through the floating point register stage. Therein, contents of register MX1, the radicand, are placed in the first operand register 432. Also during cycle 3, a following macro instruction proceeds through the translate stage.

During cycle 4, the extended-precision square root micro instruction, FSQRT MX1, proceeds through the floating point register execute stage. Therein, the radicand is retrieved from the first operand register 432 and is provided to the extended-precision square root calculator 442.

In accordance with the digit-recurrence technique described with respect to FIG. 3, cycles 4 through 6 in the diagram 500 are dedicated to translation and alignment of the radicand so that its square root can be calculated. One skilled in the art will appreciate that three pipeline cycles is typical for translation and alignment of the radicand. While the extended-precision square root micro instruction remains in the floating point execute stage, the interlock logic 450 inserts slips into the pipeline to prevent following micro instructions from prematurely advancing.

During cycle 7, the extended-precision square root calculator 442 generates a first significant bit of the square root. Because the extended-precision square root micro instruction remains in the floating point execute stage, the interlock logic 450 inserts a slip into the pipeline.

During cycles 8 through 70, the extended-precision square root calculator 442 generates the remaining 63 significant digits to form the extended-precision square root. Because the extended-precision square root micro instruction remains in the floating point execute stage, the interlock logic 450 inserts a slips into the pipeline.

During cycles 71 through 73, the calculated square root is translated and realigned to put it back into compliant extended-precision format. Also during cycle 73, the extended-precision square root is rounded/truncated to have only the number of significant bits according to single-precision format and is the rounded result is placed into the result register 444. At this point, execution of the macro instruction requiring calculation of the limited-precision square root is complete through the floating point execute stage.

As alluded to above, since the macro instruction requires calculation of the square root only to a number of significant bits in accordance with single-precision format, such format being prevalent in 3D graphics applications, then only 24 pipeline cycles are necessary to calculate significant bits of the desired result. More specifically, because an extended-precision square root calculator 442 is employed in the microprocessor 400, 40 cycles of the pipeline clock are wasted computing significant digits which will be ultimately discarded.

The example of FIGS. 4 and 5 shows that more than half of the pipeline cycles in an extended-precision square root calculator 442 are consumed performing useless data manipulations when a single-precision square root is desired. Consequently, graphics applications are burdened with an extreme number of pipeline cycles that are consumed by needless computations. This is a problem that seriously affects program execution time. One skilled in the art will appreciate that elimination of unnecessary pipeline cycles in the execution of any instruction, without requiring additional hardware, is very desirable.

The present invention allows a microprocessor to execute a macro instruction requiring calculation of a limited-precision square root without incurring the delays associated with unnecessary generation of significant digits which will be ultimately discarded. Elimination of these delays dramatically improves the execution speed for the instruction; unessential pipeline cycles are expunged from the instruction's execution path.

Figure 6:
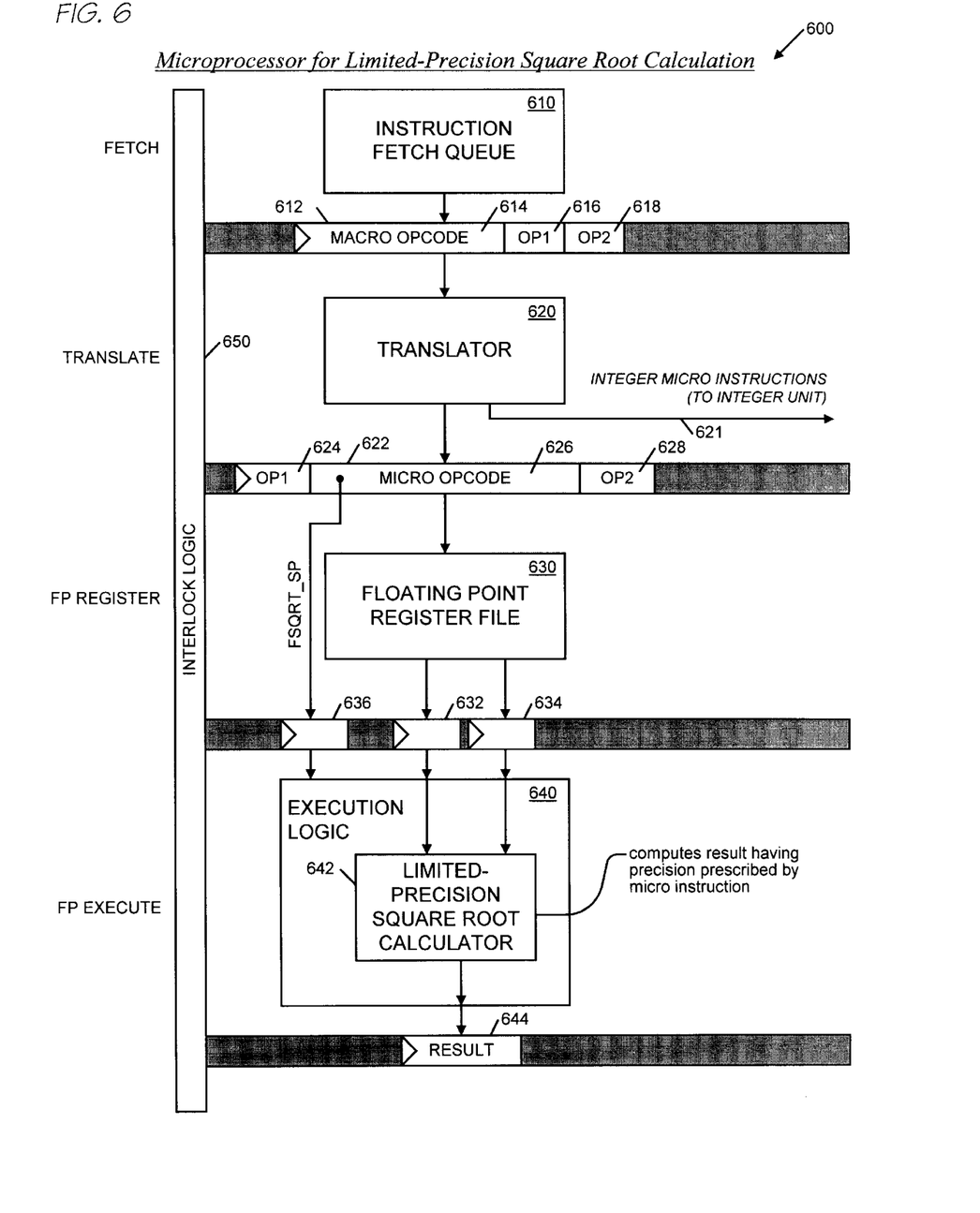
FIG. 6 is a block diagram of a microprocessor for calculating a limited-precision square root of a floating point operand according to the present invention.

Now referring to FIG. 6, a block diagram of a microprocessor 600 for executing a macro instruction requiring calculation of a limited-precision square root according to the present invention is presented. For clarity, only those stages of the microprocessor 600 are shown that are relevant to this discussion. The block diagram shows four pipeline stages associated with execution the macro instruction: fetch, translate, register, and execute. The microprocessor 600 also includes interlock logic 650.

The fetch stage has an instruction fetch queue 610 connected to an instruction buffer 612. The translate stage has a translator 620 that provides an output to a floating point micro instruction buffer 622. The register stage has a floating point register file 630. Outputs of the floating point register file 630 are provided to first and second floating point operand registers 632, 634. The floating point execute stage includes floating point execution logic 640, which receives inputs from the first and second operand registers 632, 634. The floating point execution logic 640 includes a limited-precision square root calculator 642 according to a digit-recurrence technique. The floating point execution logic 640 provides its output to a floating point result register 644. The contents of the result register 644 are provided to the write back stage so that they may be written back into the floating point register file 630 or into memory (not shown) when a micro instruction completes execution.

In operation, the instruction fetch queue 610 fetches macro instructions from memory (not shown) for execution by the microprocessor 600. The macro instructions are sequentially provided to the instruction buffer 612. The instruction buffer 612 has three fields: a macro opcode field 614, a first macro operand field 616, and a second macro operand field 618. In the case of a macro instruction requiring calculation of a limited-precision square root of an operand, the macro opcode field 614 directs the microprocessor 600 to extract the square root of the operand, which has been previously stored in an architecturally defined register, to a prescribed level of precision. The architecturally defined register is either specified by the first macro operand field 616 or is implicitly prescribed by the macro opcode field 614. The second macro operand field 618 does not contain an operand for this type of instruction.

The translator 620 retrieves a macro instruction from the macro instruction buffer 612 and decodes it into an associated sequence of micro instructions. In the case of a macro instruction requiring calculation of a limited-precision square root, the translator 620 would decode the macro instruction into a limited-precision micro instruction prescribing the desired level of precision for the result. Micro instructions directed to the integer unit (not shown) are provided on bus 621. Micro instructions directed to the floating point unit are provided to the floating point micro instruction buffer 622. The floating point micro instruction buffer 622 has three fields. Contents of a micro opcode field 626 direct the floating point unit to perform a specific subtask. Operands are provided in first and second micro operand fields 624, 628. In the event of a limited-precision square root micro instruction, the micro opcode field 626 would direct the microprocessor to extract a square root of limited-precision, i.e., single-precision, double-precision, or a specified number of significant bits, from the operand. The first micro operand field 624 would contain a reference to the architecturally defined register in the floating point register file 630 where the operand is registered in extended-precision format. The second micro operand field 628 does not contain an operand for this type of instruction. Thus, micro instructions are provided to the floating point unit of the microprocessor 600.

If the micro opcode so directs, contents of the floating point register file 630 are retrieved and placed into the first and second operand registers 632, 634. For a limited-precision square root micro instruction, a radicand, placed into the floating point register file 630 in extended-precision format by preceding micro instructions, is retrieved and placed into the first operand register 632. The second operand register 634 is not used for this type of micro instruction.

The floating point execution logic 640 retrieves the contents of registers 632 and 634 and executes the subtask specified by the micro opcode. For execution of a limited-precision square root micro instruction, the radicand is retrieved from register 632 and is provided to the prescribed-precision square root calculator 642 in extended-precision format. Thereafter, a square root extraction operation is executed using a digit-recurrence technique as described above to calculate only the number of significant bits prescribed by the limited-precision square root micro instruction. More specifically, if the limited-precision micro instruction directs the microprocessor 600 to calculate a single-precision square root, then the limited-precision square root calculator 642 executes only 24 iterations to generate 24 significant digits. If the limited-precision micro instruction directs the microprocessor 600 to calculate a double-precision square root, then the limited-precision square root calculator 642 executes only 53 iterations to generate 53 significant digits. If the limited-precision micro instruction directs the microprocessor 600 to calculate a specified-precision square root, then the prescribed-precision square root calculator 642 executes only the number of iterations to generate the number of significant digits specified. The calculated square root is then placed in the result register 644. is Because extraction of the limited-precision square root requires numerous pipeline cycles while in the limited-precision square root calculator 642, the interlock logic 650 inserts slips into the pipeline to preclude following instructions from prematurely advancing in the pipeline. Execution of graphics-related instruction directing calculation of a limited-precision square root is more particularly described with reference to FIG. 7.

Figure 7:
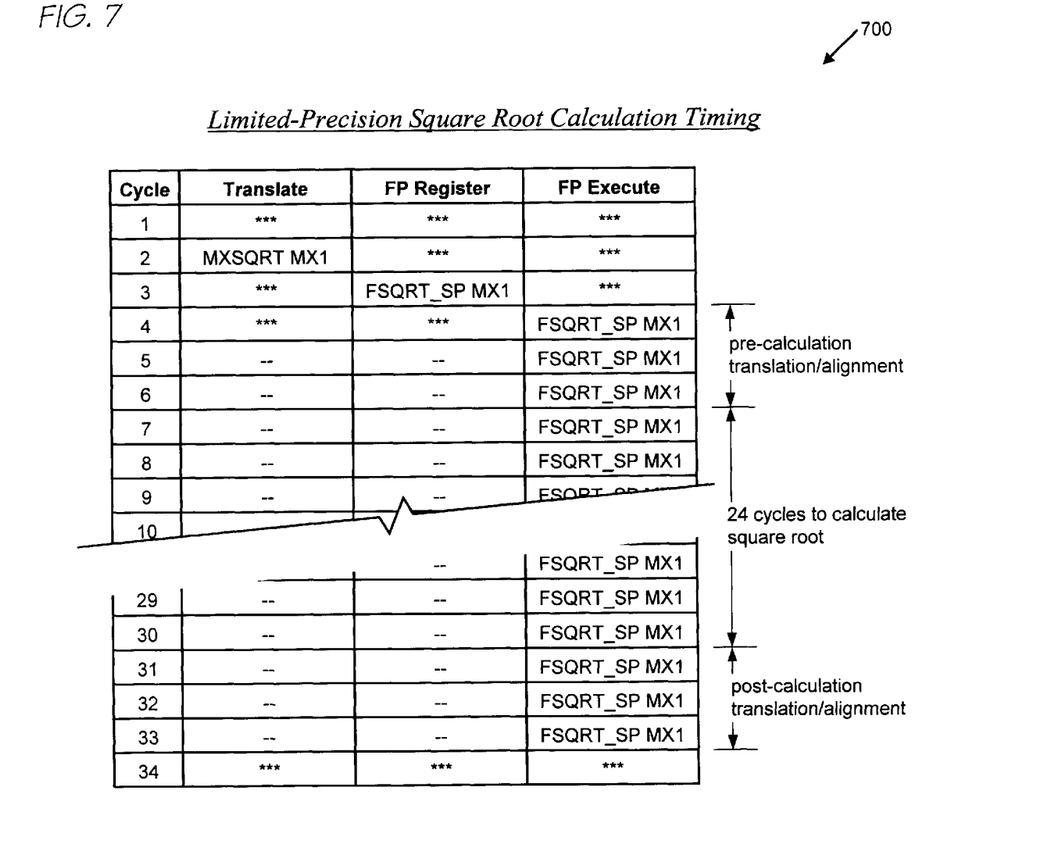
FIG. 7 is a table illustrating execution a graphics-related instruction requiring computation of a limited-precision square root by the microprocessor of FIG. 6.

FIG. 7 is a table 700 illustrating execution of a graphics-related macro instruction directing calculation of a single-precision square root by the microprocessor 600 of FIG. 6. The macro instruction directing calculation of a single-precision square root is designated by MXSQRT MX1. It directs the microprocessor 600 to calculate a single-recision square root of a radicand contained in floating point register MX1. The translator 620 decodes the macro instruction directing calculation of a single-precision square root into a single-precision square root micro instruction, designated by FSQRT_SP MX1. The single-precision square root micro instruction directs the microprocessor 600 to calculate a single-precision square root of a radicand, previously loaded into register MX1 in the floating point register file 630 in extended-precision format.

Progression of the single-precision square root micro instruction through the microprocessor 600 is shown with respect to cycles of a pipeline clock. Instructions before and after instructions of interest are designated by "*." Voids, or slips in the pipeline are designated by "--." For clarity, FIG. 7** only depicts those stages of the microprocessor pipeline that are relevant to this discussion. Hence, the fetch stage and floating point write back stage are not shown.

During cycle 2, the graphics-related macro instruction directing calculation of the single-precision square root, MXSQRT MX1, proceeds through the translate stage of the pipeline. Therein, the translator 620 retrieves it from the macro instruction buffer 612 and decodes it into the single-precision square root micro instruction described above.

During cycle 3, the single-precision square root micro instruction, FSQRT_SP MX1, proceeds through the floating point register stage. Therein, contents of register MX1, the radicand, are placed in the first operand register 632.

Also during cycle 3, a following macro instruction proceeds through the translate stage.

During cycle 4, the single-precision square root micro instruction, FSQRT_SP MX1, proceeds through the floating point register execute stage. Therein, the radicand is retrieved from the first operand register 632 and is provided to the limited-precision square root calculator 642.

In accordance with the digit-recurrence technique described with respect to FIG. 3, cycles 4 through 6 in the diagram 700 are dedicated to translation and alignment of the radicand so that its square root can be calculated. While the single-precision square root micro instruction remains in the floating point execute stage, the interlock logic 650 inserts slips into the pipeline to prevent following micro instructions from prematurely advancing.

During cycle 7, the limited-precision square root calculator 642 generates a first significant digit of the single-precision square root. Because the single-precision square root micro instruction remains in the floating point execute stage, the interlock logic 650 inserts a slip into the pipeline.

During cycles 8 through 30, the limited-precision square root calculator 642 generates the remaining 23 significant digits to form the single-precision square root. Because the single-precision square root micro instruction remains in the floating point execute stage, the interlock logic 650 inserts a slips into the pipeline.

During cycles 31 through 33, the calculated square root is translated and realigned to restore it to standard format. Also during cycle 33, the square root is placed into the result register 644. At this point, execution of the graphics-related macro instruction requiring calculation of the single-precision square root is complete through the floating point execute stage.

In contrast to the extended-precision square root calculator 442 of FIG. 4, the limited-precision square root calculator 642 according to the present invention only computes a number of significant bits in a square root commensurate with the specified precision. For calculation of a single-precision square root, common to graphics applications, this means that the instruction executes in less than half of the time required to perform the same operation in conventional microprocessors. The present invention only computes the number of significant digits in a square root which are commensurate with a desired result.

The example of FIGS. 6 and 7 shows that, for the case of a single-precision square root, use of the present invention eliminates 40 useless data manipulation cycles. For the case of a double-precision square root, use of the present invention eliminates 11 useless data manipulation cycles, still a significant improvement. Elimination of unnecessary pipeline delays notably improves the execution speed for instructions requiring calculation of a prescribed-precision square root.

Figure 8:
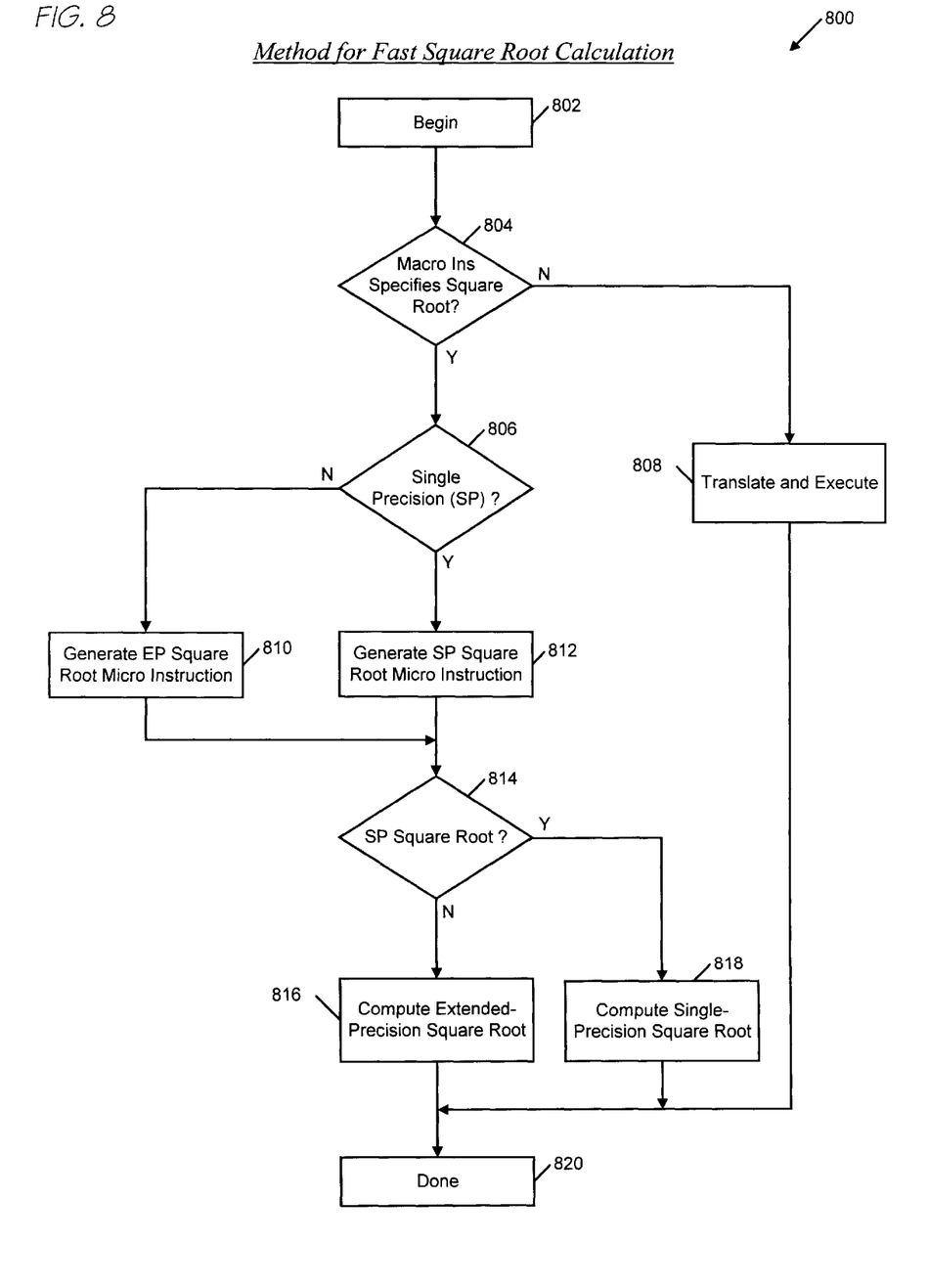
FIG. 8 is a flow chart illustrating a method for calculating a limited-precision square root in a microprocessor according to the present invention.

Now referring to FIG. 8, a flow chart 800 is presented illustrating a method for calculating a limited-precision square root in a microprocessor according to the present invention.

Flow begins at block 802 where a macro instruction is fetched from a macro instruction buffer. Flow then proceeds to decision block 804.

At decision block 804, the macro instruction is evaluated to determine if it directs the microprocessor to calculate a square root. If not, then flow proceeds to block 808. If so, then flow proceeds to decision block 806.

At block 808, the macro instruction is translated into an associated sequence of micro instructions, which are then executed by the microprocessor. Flow then proceeds to block 820.

At decision block 806, the macro instruction directing the microprocessor to calculate a square root is evaluated to determine if it is to calculate a number of significant bits of the square root according to single-precision format. If so, then flow proceeds to block 812. If not, then flow proceeds to block 810.

At block 810, a translator generates an extended-precision square root micro instruction directing the microprocessor to calculate a number of significant bits of the square root according to extended-precision format. Flow then proceeds to decision block 814.

At block 812, the translator generates a single-precision square root micro instruction directing the microprocessor to calculate a number of significant bits of the square root according to single-precision format. Flow then proceeds to decision block 814.

At decision block 814, a floating point radicand is provided in extended-precision format to floating point execution logic in the microprocessor. The micro instruction is evaluated to determine if it is a single-precision square root micro instruction. If so, then flow proceeds to block 818. If not, then flow proceeds to block 816.

At block 816, the floating point execution logic calculates a number of significant bits for the square root according to extended-precision format. Flow then proceeds to block 820.

At block 818, the floating point execution logic calculates a number of significant bits for the square root according to single-precision format. Flow then proceeds to block 820.

At block 820, the method completes.

In alternative embodiments of the method, a double-precision square root or a square root having a specified number of significant bits can be specified and calculated.

Although the present invention and its objects, features, and advantages have been described in detail, other embodiments are encompassed by the invention. For example, the present invention has been particularly described in terms of limiting the number of calculated significant bits of a square root computed from a radicand provided in extended-precision format. Although extended-precision format is currently the de facto standard for floating point execution logic, the scope of the present invention extends to any format where a square root of lesser precision is calculated. Improvements in data processing capabilities of microprocessors will result in future formats that comprise even greater numbers of bits in a significand. The present invention anticipates such improvements to the extent that calculation of unnecessary significant bits in a square root is eliminated.

In addition, the present invention has been characterized primarily with regard to calculation of a square root in a microprocessor. It is inconsequential, however, from what host platform the calculation is performed. Rather, it can be performed upon any platform an execution unit capable of extracting a square root from a floating point radicand to include signal processors, embedded controllers, array processors, and industrial controllers.

Furthermore, the present invention has been particularly described in terms of calculating a square root having a number of significant bits less than the number of significant bits in a provided radicand. However, the present invention anticipates applications wherein the square root has a number of significant bits greater than the number of significant bits in a provided radicand.

Moreover, the present invention has been described in terms of extraction of a square root of a floating point operand by floating point logic in a microprocessor. However, the present invention is applicable to extraction of a square root of any binary operand where digit-recurrence techniques are employed to iteratively calculate significant bits in the square root.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A microprocessor for calculating a square root of an operand, the microprocessor having a plurality of square root instructions, each of which specifies a square root calculation precision, the square root calculation precision specifying the number of significand bits to be provided in the square root, the microprocessor comprising:

translation logic, configured to receive the plurality of square root instructions, and to provide a plurality of prescribed-precision machine instructions, said plurality of prescribed-precision machine instructions directing the microprocessor to calculate no more than the number of significand bits according to the square root calculation precision specified by the plurality of square root instructions; and execution logic, coupled to said translation logic, configured to receive said plurality of prescribed-precision machine instructions, and configured to calculate the number of significand bits for the square root of the operand according to the square root calculation precision;

wherein at least one of the plurality of square root instructions specifies the square root calculation precision such that less significand bits are calculated in the square root than are provided in the operand.

2. The microprocessor as recited in claim 1, wherein one of said plurality of prescribed-precision machine instructions directs the microprocessor to calculate a single-precision square root.

3. The microprocessor as recited in claim 1, wherein one of said plurality of prescribed-precision machine instructions directs the microprocessor to calculate a double-precision square root.

4. The microprocessor as recited in claim 1, wherein one of said plurality of prescribed-precision machine instructions comprises:

a precision field, specifying a number of significand bits to which the square root is to be calculated.

5. The microprocessor as recited in claim 1, wherein the operand is registered in extended-precision format.

6. The microprocessor as recited in claim 1, wherein said execution logic comprises:
   a square root calculator, configured to compute the number of significand bits in the square root of the operand to a precision prescribed by said plurality of prescribed-precision machine instructions by employing an iterative technique to generate one significand bit of the square root per iteration of said iterative technique.

7. The microprocessor as recited in claim 6, wherein said square root calculator stops generating significand bits when the square root calculation precision has been reached.

8. A microprocessor for calculating a limited-precision square root of a floating point operand, the limited-precision square root having less significand bit than the floating point operand, the microprocessor comprising:
   a translator, configured to receive a macro instruction prescribing a first number of significand bits for the limited-precision square root, and configured to decode said macro instruction into a limited-precision square root micro instruction; and
   floating point execution logic, coupled to said translation logic, configured to receive said limited-precision square root micro instruction, and configured to calculate the limited-precision square root, wherein said floating point execution logic calculates no more significand bits in the limited-precision square root than has been prescribed by said first number.

9. The microprocessor as recited in claim 8, wherein said limited-precision square root micro instruction directs the microprocessor to calculate a single-precision square root.

10. The microprocessor as recited in claim 8, wherein said limited-precision square root micro instruction directs the microprocessor to calculate a double-precision square root.

11. The microprocessor as recited in claim 8, wherein said limited-precision square root micro instruction comprises:
    a precision field, specifying a second number of significand bits to which the limited-precision square root is to be calculated, said second number of significand bits being equal to said first number of significand bits prescribed by said macro instruction.

12. The microprocessor as recited in claim 8, wherein the floating point operand is registered in extended-precision format.

13. The microprocessor as recited in claim 8, wherein said floating point execution logic comprises:
    a square root calculator, configured to compute the limited-precision square root of the floating point operand to a prescribed precision by employing an iterative technique to generate one significand bit of the limited-precision square root per iteration of said iterative technique.

14. The microprocessor as recited in claim 13, wherein said square root calculator stops generating the significand bits when said prescribed precision of the limited-precision square root has been reached.

15. An apparatus in a microprocessor for calculating a limited-precision square root of a floating point operand, the limited-precision square root having a first number of significand bits less than a second number of significand bits in the floating point operand, comprising:
    a translator, configured to receive a macro instruction prescribing the first number of significand bits, and to decode said macro instruction into a limited-precision square root micro instruction; and
    floating point execution logic, coupled to said translation logic, configured to receive and execute said limited-precision square root micro instruction, said floating point execution logic comprising:
      a square root calculator, configured compute the limited-precision square root of the floating point operand only to the first number of significand bits according to a precision specified in said limited-precision square root micro instruction, wherein the floating point operand is provided to said square root calculator in extended-precision format.

16. The apparatus as recited in claim 15, wherein said limited-precision square root micro instruction directs the microprocessor to calculate a single-precision square root.

17. The apparatus as recited in claim 15, wherein said limited-precision square root micro instruction directs the microprocessor to calculate a double-precision square root.

18. The apparatus as recited in claim 15, wherein said limited-precision square root micro instruction comprises:
    a precision field, specifying a third number of significand bits to which the limited-precision square root is to be calculated, said third number of significand bits being equal to the first number of significand bits prescribed by said macro instruction.

19. The apparatus as recited in claim 15, wherein the floating point operand comprises 64 significand bits.

20. The apparatus as recited in claim 15, wherein said square root calculator employs an iterative technique to generate one significand bit of the limited-precision square root per iteration of said iterative technique.

21. The apparatus as recited in claim 20, wherein said square root calculator stops generating significand bits when said precision has been reached.

22. A microprocessor for calculating a limited-precision square root or an extended-precision square root of a floating point operand, the floating point operand being provided in extended-precision format, the microprocessor comprising:
    a translator, configured to receive a macro instruction prescribing a calculated precision for a square root, and configured to decode said macro instruction into an associated micro instruction, said associated micro instruction comprising:
      when said calculated precision prescribed by said macro instruction is extended-precision, an extended-precision square root micro instruction, directing the microprocessor compute a number of significand bits for the square root commensurate with extended-precision format; or
      when said calculated precision prescribed by said macro instruction is single-precision, a single-precision square root micro instruction, directing the microprocessor compute a number of significand bits for the square root commensurate with single-precision format; and
    floating point execution logic, coupled to said translation logic, configured to receive and execute said associated micro instruction, wherein said floating point execution logic calculates only a number of significand bits for the square root according to said calculated precision.

23. The microprocessor as recited in claim 22, wherein said associated micro instruction further comprises:
    when said calculated precision prescribed by said macro instruction is double-precision, a double-precision square root micro instruction, directing the microprocessor compute a number of significand bits for the square root commensurate with double-precision format.

24. The microprocessor as recited in claim 22, wherein the floating point operand comprises 64 significand bits.

25. The microprocessor as recited in claim 22, wherein said square root calculator employs an iterative technique to generate one significand bit of the square root per iteration of said iterative technique.

26. A method in a microprocessor for calculating a limited-precision square root of a floating point operand, the limited-precision square root having a number of calculated significand bits less than the number of significand bits in the floating point operand, comprising:
   a) translating a macro instruction into a limited-precision micro instruction, the limited-precision micro instruction specifying the number of significand bits to calculate; and
   b) calculating the limited-precision square root only up to the number of significand bits specified by said translating.

27. The method as recited in claim 26, further comprising:
   c) providing the floating point operand in extended-precision format for execution of said calculating.

28. The method as recited in claim 26, wherein said translating specifies the number of significand bits according to single-precision format.

29. The method as recited in claim 26, wherein said translating specifies the number of significand bits according to double-precision format.

30. The method as recited in claim 26, wherein said translating specifies the number of significand bits within a precision field of the limited-precision micro instruction.

* * * * *